(12) United States Patent
Wang

(10) Patent No.: US 12,494,879 B2
(45) Date of Patent: Dec. 9, 2025

(54) INFORMATION INDICATION METHOD AND APPARATUS, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Shukun Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 545 days.

(21) Appl. No.: 17/743,358

(22) Filed: May 12, 2022

(65) Prior Publication Data

US 2022/0278804 A1 Sep. 1, 2022

Related U.S. Application Data

(63) Continuation of application No. PCT/CN2020/070147, filed on Jan. 2, 2020.

(51) Int. Cl.
*H04L 5/00* (2006.01)
*H04L 12/18* (2006.01)
*H04W 4/06* (2009.01)

(52) U.S. Cl.
CPC ........ *H04L 5/0051* (2013.01); *H04L 12/1881* (2013.01); *H04W 4/06* (2013.01)

(58) Field of Classification Search
CPC . H04L 5/0051; H04L 5/1881; H04L 12/1881; H04W 4/06
See application file for complete search history.

(56) References Cited

U.S. PATENT DOCUMENTS

| | | | | |
|---|---|---|---|---|
| 2018/0206289 | A1* | 7/2018 | Kim | H04W 72/12 |
| 2019/0261140 | A1* | 8/2019 | Fujishiro | H04W 80/02 |
| 2019/0386769 | A1 | 12/2019 | Liu et al. | |
| 2020/0204329 | A1* | 6/2020 | Fujishiro | H04L 1/1861 |
| 2021/0168786 | A1* | 6/2021 | Takano | H04W 72/30 |

(Continued)

FOREIGN PATENT DOCUMENTS

| | | |
|---|---|---|
| CN | 101163026 A | 4/2008 |
| CN | 102047699 A | 5/2011 |

(Continued)

OTHER PUBLICATIONS

The EESR of corresponding European application No. 20908818.6 dated on Sep. 28, 2022.

(Continued)

*Primary Examiner* — Wayne H Cai
(74) *Attorney, Agent, or Firm* — Ladas & Parry, LLP

(57) ABSTRACT

Embodiments of the present disclosure provide an information indication method and apparatus, a terminal device and a network device, the method includes: a terminal device receives first indication information sent by a network device, where the first indication information is used to indicate at least one of the following: a first MBMS service requiring to be received by a connected-state terminal device; a first MBMS service requiring HARQ feedback to (Continued)

Beam sweeping be performed; a first MBMS service requiring CSI reporting to be performed; or a first MBMS service requiring beam management to be performed.

18 Claims, 4 Drawing Sheets

(56) References Cited

U.S. PATENT DOCUMENTS

| | | | | |
|---|---|---|---|---|
| 2021/0185691 A1* | 6/2021 | Park | ................... | H04W 72/53 |
| 2021/0195565 A1* | 6/2021 | Venugopal | ............ | H04L 5/0096 |

FOREIGN PATENT DOCUMENTS

| | | |
|---|---|---|
| CN | 102833684 A | 12/2012 |
| CN | 106470398 A | 3/2017 |
| CN | 106470498 A | 3/2017 |
| CN | 110169104 A | 8/2019 |
| CN | 110392348 A | 10/2019 |
| CN | 110401922 A | 11/2019 |
| WO | 2019116773 A1 | 6/2019 |
| WO | 2021134764 A1 | 7/2021 |

OTHER PUBLICATIONS

The second Office Action of corresponding European application No. 20908818.6, dated Nov. 21, 2023.
The third Office Action of corresponding European application No. 20908818.6, dated May 7, 2024.
The first Office Action and search report of corresponding Chinese application No. 202310477912.7, dated Jul. 3, 2024.
ETRI, "Evaluating point-to-point bearer for single-cell MBMS transmission", R2-062445, 3GPP TSG RAN WG2 #54, Tallinn, Estonia, Aug. 28-Sep. 1, 2006, all pages.
The first Office Action of corresponding European patent application No. 20908818.6, dated Jun. 23, 2023.
International Search Report (ISR) dated Sep. 14, 2020 for Application No. PCT/CN2020/070147.
Written Opinion (WOSA) dated Sep. 14, 2020 for Application No. PCT/CN2020/070147.
The Summons to attend oral proceedings of corresponding European application No. 20908818.6, dated Dec. 13, 2024.

* cited by examiner

A terminal device receives first indication information sent by a network device, where the first indication information is used to indicate at least one of the following: a first MBMS service requiring to be received by a connected-state terminal device; a first MBMS service requiring HARQ feedback to be performed; a first MBMS service requiring CSI reporting to be performed; a first MBMS service requiring beam management to be performed — 801

FIG. 8

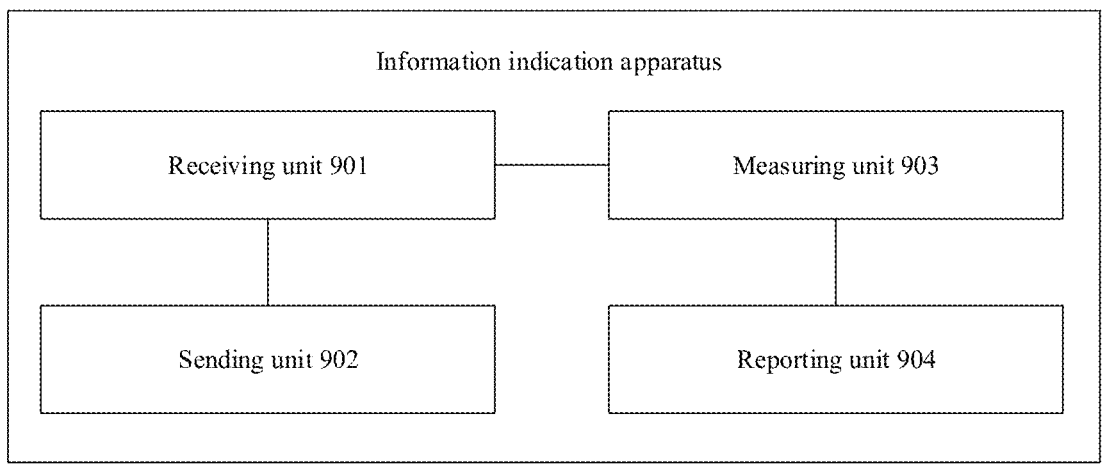

FIG. 9

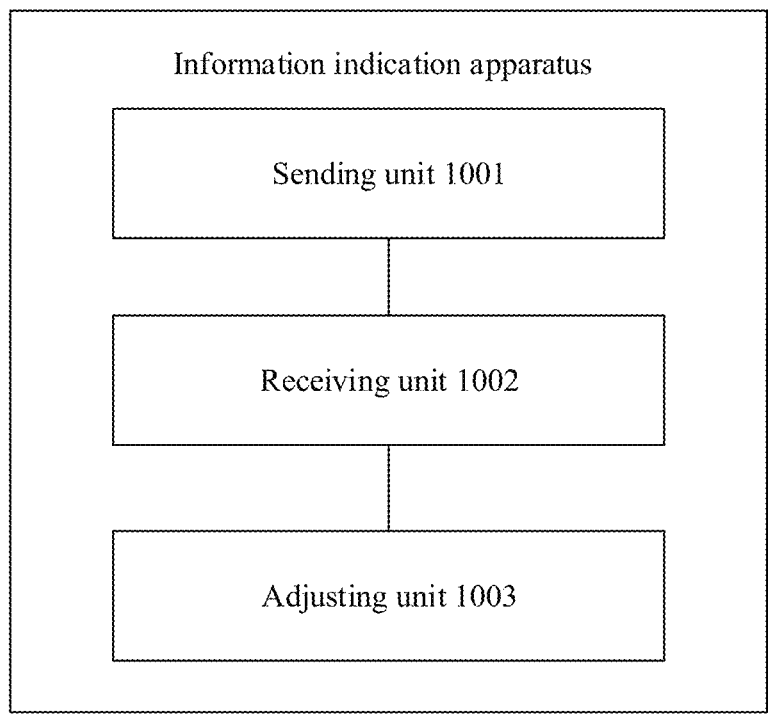

FIG. 10

INFORMATION INDICATION METHOD AND APPARATUS, TERMINAL DEVICE, AND NETWORK DEVICE

CROSS-REFERENCE TO RELATED APPLICATIONS

This disclosure is a continuation of International Application No. PCT/CN2020/070147, filed on Jan. 2, 2020, the disclosure of which is hereby incorporated by reference in its entirety.

TECHNICAL FIELD

Embodiments of the present disclosure relates to the field of mobile communication technologies and in particular, to an information indication method and apparatus, a terminal device and a network device.

BACKGROUND

Multimedia broadcast multicast service (Multimedia Broadcast Multicast Service, MBMS) is a technology that transmits data from one data source to multiple users through sharing network resources, this technology can effectively use network resources while providing multimedia services to realize broadcast and groupcast of multimedia services with a high rate (such as 256 kbps).

In a new radio (New Radio, NR) system, service requirements of groupcast and broadcast need to be supported in many scenarios, such as in Internet of vehicles and industrial Internet. Therefore, it is necessary to introduce MBMS into the NR. And how to dynamically adjust scheduling information of an MBMS service and how to carry out beam management need to be clarified.

SUMMARY

Embodiments of the present disclosure provide an information indication method and apparatus, a terminal device and a network device.

An information indication method provided by an embodiment of the present disclosure includes:
receiving, by a terminal device, first indication information sent by a network device, where the first indication information is used to indicate at least one of the following:
a first multimedia broadcast multicast service (Multimedia Broadcast Multicast Service, MBMS) service requiring to be received by a connected-state terminal device;
a first MBMS service requiring hybrid automatic repeat request (Hybrid Automatic Repeat request, HARQ) feedback to be performed;
a first MBMS service requiring channel state information (Channel State Information, CSI) reporting to be performed; or
a first MBMS service requiring beam management to be performed.

An information indication method provided by an embodiment of the present disclosure includes:
sending, by a network device, first indication information to a terminal device, where the first indication information is used to indicate at least one of the following:
a first MBMS service requiring to be received by a connected-state terminal device;
a first MBMS service requiring HARQ feedback to be performed;
a first MBMS service requiring CSI reporting to be performed; or
a first MBMS service requiring beam management to be performed.

An information indication apparatus provided by an embodiment of the present disclosure is applied to a terminal device, and the apparatus includes:
a receiving unit, configured to receive first indication information sent by a network device, where the first indication information is used to indicate at least one of the following:
a first MBMS service requiring to be received by a connected-state terminal device;
a first MBMS service requiring HARQ feedback to be performed;
a first MBMS service requiring CSI reporting to be performed; or
a first MBMS service requiring beam management to be performed.

An information indication apparatus provided by an embodiment of the present disclosure is applied to a network device, and the apparatus includes:
a sending unit, configured to send first indication information to a terminal device, where the first indication information is used to indicate at least one of the following:
a first MBMS service requiring to be received by a connected-state terminal device;
a first MBMS service requiring HARQ feedback to be performed;
a first MBMS service requiring CSI reporting to be performed; or
a first MBMS service requiring beam management to be performed.

A terminal device provided by an embodiment of the present disclosure includes a processor and a memory. The memory is configured to store a computer program, and the processor is configured to call and run the computer program stored in the memory to execute the above information indication method.

A network device provided by an embodiment of the present disclosure includes a processor and a memory. The memory is configured to store a computer program, and the processor is configured to call and run the computer program stored in the memory to execute the above information indication method.

A chip provided by an embodiment of the present disclosure is used to implement the above information indication method.

Specifically, the chip includes a processor, configured to call and run a computer program from a memory, to cause a device installed with the chip to execute the above information indication method.

A computer readable storage medium provided by an embodiment of the present disclosure is configured to store a computer program, to cause a computer to execute the above information indication method.

A computer program product provided by an embodiment of the present disclosure includes computer program instructions which cause a computer to execute the above information indication method.

A computer program provided by an embodiment of the present disclosure causes a computer to execute the above information indication method when it is running on the computer.

Through the above technical solutions, a network device indicates some information related to a MBMS service to a terminal device, so that an NR system supports scheduling adaptation of the MBMS service and beam management of the MBMS service, transmission spectrum efficiency of the MBMS service is improved and transmission reliability of the MBMS service is ensured.

BRIEF DESCRIPTION OF DRAWINGS

The drawings described herein are used to provide a further understanding of the present disclosure and constitute a part of the present disclosure. The illustrative embodiments of the present disclosure and their descriptions are used to explain the present disclosure and do not constitute an improper limitation of the present disclosure. In accompanying drawings:

FIG. 8 is a schematic flow diagram of an information indication method according to an embodiment of the present disclosure;

FIG. 9 is a first schematic diagram of a structural composition of an information indication apparatus according to an embodiment of the present disclosure;

FIG. 10 is a second schematic diagram of a structural composition of an information indication apparatus according to an embodiment of the present disclosure;

DESCRIPTION OF EMBODIMENTS

Technical solutions of embodiments of the present disclosure will be described below with reference to the accompanying drawings of the embodiments of the present disclosure. Obviously, the described embodiments are part, rather than all, of the present disclosure. Based on the embodiments of the present disclosure, all other embodiments obtained by those skilled in the art without any creative effort shall fall within the protection scope of the present disclosure.

Technical solutions of the embodiments of the present disclosure may be applied to various communication systems, such as a long term evolution (Long Term Evolution, LTE) system, an LTE frequency division duplex (Frequency Division Duplex, FDD) system, an LTE time division duplex (Time Division Duplex, TDD) system, a 5G communication system or a future communication system.

Figure 1:
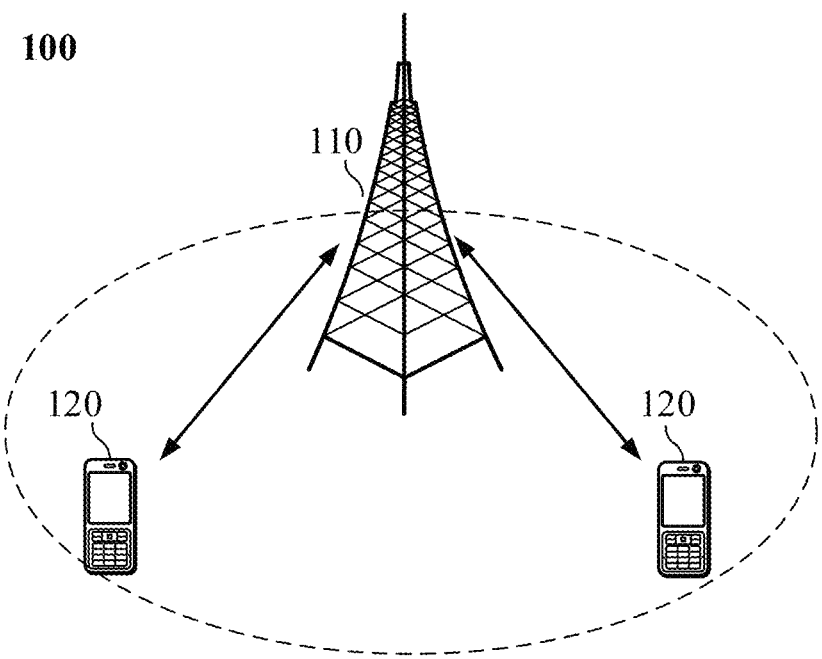
FIG. 1 is a schematic diagram of communication system architecture according to an embodiment of the present disclosure.

Illustratively, a communication system 100 where the embodiments of the present disclosure is applied is shown in FIG. 1. The communication system 100 may include a network device 110, which may be a device that communicates with a terminal 120 (or may be referred to as a communication terminal, a terminal). The network device 110 may provide communication coverage for a specific geographical area and may communicate with terminals located within the coverage area. In an implementation, the network device 110 may be an evolutional base station (Evolutional Node B, ENB or eNodeB) in the LTE system, or a wireless controller in a cloud radio access network (Cloud Radio Access Network, CRAN), or the network device may be a mobile switching center, a relay station, an access point, an vehicle device, a wearable device, a concentrator, a switch, a network bridge, a router, a network-side device in a 5G network or a network device in a future communication system, or the like.

The communication system 100 further includes at least one terminal 120 located within coverage of the network device 110. "Terminal" used herein includes, but is not limited to being connected via a wireline, such as via public switched telephone networks (Public Switched Telephone Networks, PSTN), a digital subscriber line (Digital Subscriber Line, DSL), a digital cable, a direct cable; and/or, another data connection/network; and/or, via a wireless interface, for example, for a cellular network, a wireless local area network (Wireless Local Area Network, WLAN), a digital television network such as a DVB-H network, a satellite network, an AM-FM broadcast transmitter; and/or, an apparatus configured to receive/transmit a communication signal, of another terminal; and/or, an Internet of things (Internet of Things, IOT) device. The terminal set to communicate via a wireless interface may be referred to as a "wireless communication terminal", a "wireless terminal" or a "mobile terminal". Examples of the mobile terminal include, but are not limited to, a satellite or cellular phone; a personal communications system (Personal Communications System, PCS) terminal that can combine a cellular radiotelephone with data processing, fax and data communication capabilities; a personal digital assistant (Personal Digital Assistant, PDA) which may include a radiotelephone, a pager, Internet/intranet access, a Web browser, a notebook, a calendar, and/or a global positioning system (Global Positioning System, GPS) receivers; and a conventional laptop or handheld transceiver or other electronic apparatuses including a radiotelephone transceiver. The terminal may refer to an access terminal, user equipment (User Equipment, UE), a user unit, a user station, a mobile station, a mobile platform, a remote station, a remote terminal, a mobile device, a user terminal, a terminal, a wireless communication device, a user agent or user apparatus. The access terminal may be a cellular telephone, a cordless telephone, a session initiation protocol (Session Initiation Protocol, SIP) telephone, a wireless local loop (Wireless Local Loop, WLL) station, a PDA, a handheld device with wireless communication function, a computing device or other processing device connected to a wireless modem, an on-board device, a wearable device, a terminal in a 5G network or a terminal in future evolved public land mobile network (Public Land Mobile Network, PLMN), etc.

In an implementation, device to device (Device to Device, D2D) communication may be performed between terminals 120.

In an implementation, the 5G communication system or 5G network may also be referred to as a new radio (New Radio, NR) system or an NR network.

FIG. 1 illustratively shows one network device and two terminals. In an implementation, the communication system 100 may include a plurality of network devices, and the coverage of each network device may include other numbers of terminals, which is not limited in the embodiments of the present disclosure.

In an implementation, the communication system 100 may also include other network entities, such as a network controller and a mobile management entity, which is not limited in the embodiments of the present disclosure.

It should be understood that, a device with a communication function in the network/system in the embodiments of the present disclosure may be referred to as a communication device. Taking the communication system 100 shown in FIG. 1 as an example, the communication device may include the network device 110 and the terminal 120 that have a communication function. The network device 110 and the terminal 120 may be specific devices as described above, which will not be repeated here; the communication device may further include other devices in the communication system 100, such as a network controller, a mobile management entity and other network entities, which are not limited in embodiments of the present disclosure.

It should be understood that, the terms "system" and "network" used herein are often used interchangeably. The term "and/or" herein is merely describing an association relationship of association objects, which indicates that there may be three relationships. For example, A and/or B, which may indicate three conditions: A exists alone, A and B exist at the same time, and B exists alone. In addition, the character "/" herein generally indicates that the associated objects before and after the character are in an "or" relationship.

In order to facilitate the understanding of technical solutions of embodiments of the present disclosure, the technical solutions related to the embodiments of the present disclosure are described below.

With people's pursuit of speed, delay, high-speed mobility, energy efficiency and diversity and complexity of services in future life, the 3rd Generation Partnership Project ($3^{rd}$ Generation Partnership Project, 3GPP) international standard organization began to develop 5G. Main application scenarios of 5G are: enhanced mobile broadband (enhanced Mobile Broadband, eMBB), ultra-reliable low-latency communications (Ultra-Reliable Low-Latency Communications, URLLC), and massive machine-type communications (massive Machine-Type Communications, mMTC).

On the one hand, eMBB still aims at users' access to multimedia content, services and data, and its demand is growing rapidly. On the other hand, since eMBB may be deployed in different scenarios, such as indoor, urban and rural areas, and its capabilities and requirements are also quite different, it cannot be generalized, and must be analyzed in detail in combination with specific deployment scenarios. Typical applications of URLLC include: industrial automation, power automation, telemedicine operation (surgery), traffic safety guarantee, etc. Typical characteristics of mMTC include: high connection density, small amount of data, delay insensitive service, low cost and long service life of module, etc.

In an early deployment of NR, full NR coverage is difficult to obtain, so typical network coverage is a mode of wide area LTE coverage and NR island coverage. Moreover, a large amount of LTE is deployed below 6 GHz, and there are few spectrums below 6 GHz which are available for 5G. Therefore, NR must study spectrum application above 6 GHz, but coverage is limited and signal attenuation is fast at a high frequency band. At the same time, in order to protect the early investment of mobile operators in LTE, an operation mode of tight interworking (tight interworking) between LTE and NR is proposed.

> Radio Resource Control (Radio Resource Control, RRC) Status 5G defines a new RRC state, that is, RRC inactive (RRC_INACTIVE) state for the purpose of reducing air interface signaling, quickly restoring wireless connection and quickly restoring data service. This state is different from an RRC idle (RRC_IDLE) state and an RRC active (RRC_ACTIVE) state.

1) RRC_IDLE state (referred to as idle (idle) state for short): mobility is cell selection and reselection based on UE, paging is initiated by a core network (Core Network, CN), and a paging area is configured by the CN. There is no UE context on the base station side and no RRC connection exists.
2) RRC_CONNECTED state (referred to as connected (connected) state for short): there is an RRC connection, and there is UE context on the base station side and UE side. The network side knows a location of the UE at a specific cell level. Mobility is the mobility controlled by the network side. Unicast data may be transmitted between the UE and the base station.
3) RRC_INACTIVE state (referred to as inactive (inactive) state for short): mobility is cell selection and reselection based on UE. There is a connection between CN-NR, the UE context exists on a certain base station, paging is triggered by a radio access network (Radio Access Network, RAN), and a RAN-based paging area is managed by the RAN. The network side knows a location of UE at a RAN-based paging area level.

> Beam Sweeping

Figure 2:
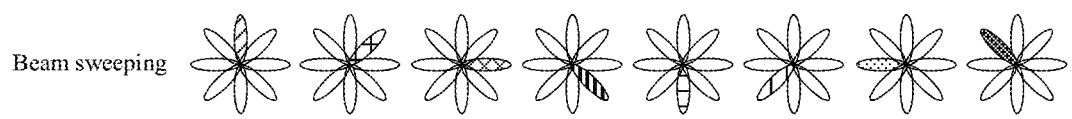
FIG. 2 is a schematic diagram of beam sweeping according to an embodiment of the present disclosure.
Figure 3:
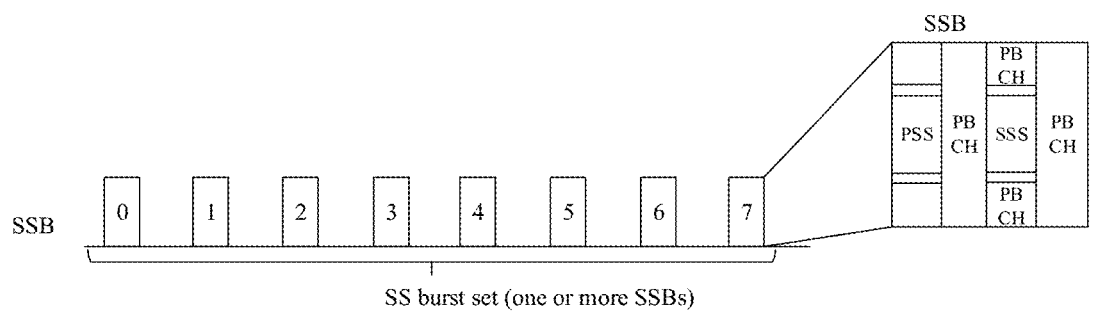
FIG. 3 is a schematic diagram of an SS/PBCH block (SS/PBCH block, SSB) according to an embodiment of the present disclosure.
Figure 4:
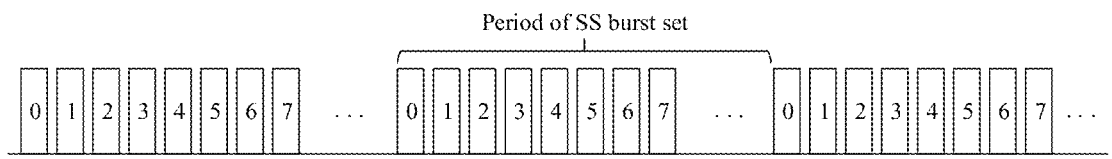
FIG. 4 is a schematic diagram of an SSB burst set period according to an embodiment of the present disclosure.

NR will be deployed on high frequency in the future, and in order to improve coverage, a mechanism of beam sweeping is introduced into 5G to meet the requirements of coverage (exchanging space for coverage, and exchanging time for space), as shown in FIG. 2. After beam sweeping is introduced, a synchronisation signal needs to be sent in each beam direction. Synchronisation signals of 5G are given in a form of synchronisation signal block (SS/PBCH block, SSB), including a primary synchronisation signal (Primary Synchronisation Signal, PSS), a secondary synchronisation signal (Secondary Synchronisation Signal, SSS), and a physical broadcast channel (Physical Broadcast Channel, PBCH), as shown in FIG. 3. The synchronisation signals of 5G appear periodically in a time domain in a form of synchronisation signal burst set (SS burst set), as shown in FIG. 4.

The number of beams actual transmitted in each cell is determined by network side configuration, but a frequency point of a cell determines the maximum number of beams that may be configured, as shown in Table 1 below.

TABLE 1

| Frequency range | L (the maximum number of beams) |
| --- | --- |
| up to 3 (2.4) GHz | 4 |
| 3 (2.4) GHz-6 GHz | 8 |
| 6 GHz-52.6 GHz | 64 |

➢Multimedia broadcast multicast service (Multimedia Broadcast Multicast Service, MBMS)

3GPP version 6 (Release 6, R6) introduces MBMS. MBMS is a technology that transmits data from one data source to multiple UEs through sharing network resources, and this technology can effectively use network resources while providing multimedia services to realize the broadcast and groupcast of multimedia services with a high rate (such as 256 kbps).

Since spectral efficiency of MBMS in 3GPP R6 is relatively low, it is not enough to effectively bear and support operations of mobile TV type services. Therefore, in LTE, 3GPP clearly proposes to enhance the support capability for downlink high-speed MBMS services, and determines design requirements for physical layer and air interface.

3GPP R9 introduces evolved MBMS (evolved MBMS, eMBMS) into LTE. eMBMS proposes a concept of single frequency network (Single Frequency Network, SFN), i.e., a multimedia broadcast multicast service single frequency network (Multimedia Broadcast multicast service Single Frequency Network, MBSFN). MBSFN adopts a unified frequency to send service data in all cells at the same time, but synchronisation should be ensured among cells. In this way, overall signal-to-noise ratio distribution of the cells can be greatly improved, and the spectral efficiency will be greatly improved accordingly. eMBMS implements service broadcast and multicast based on IP multicast protocol.

In LTE or enhanced LTE (LTE-Advanced, LTE-A), there is only a broadcast bearer mode for MBMS and no multicast bearer mode. In addition, reception of MBMS services is applicable to UE in an idle state or a connected state.

In 3GPP R13, a concept of single cell point to multipoint (Single Cell Point To Multipoint, SC-PTM) is introduced, which is based on MBMS network architecture.

MBMS introduces new logical channels, including a single cell-multicast control channel (Single Cell-Multicast Control Channel, SC-MCCH) and a single cell-multicast transport channel (Single Cell-Multicast Transport Channel, SC-MTCH). The SC-MCCH and SC-MTCH are mapped to a downlink-shared channel (Downlink-Shared Channel, DL-SCH), and further, the DL-SCH is mapped to a physical downlink shared channel (Physical Downlink Shared Channel, PDSCH), where the SC-MCCH and SC-MTCH belong to logical channels, the DL-SCH belongs to a transport channel, and the PDSCH belongs to a physical channel. The SC-MCCH and SC-MTCH do not support hybrid automatic repeat request (Hybrid Automatic Repeat request, HARQ) operations.

MBMS introduces a new type of system information block (System Information Block, SIB), i.e., SIB20. Specifically, configuration information of the SC-MCCH is transmitted through SIB20, and there is only one SC-MCCH in a cell. The configuration information of the SC-MCCH includes information about a modification period of the SC-MCCH, a repetition period of the SC-MCCH, and a radio frame and subframe for scheduling the SC-MCCH, and the like. Further, 1) a boundary of the modification period of the SC-MCCH meets SFN mod m=0, where SFN represents a system frame number of the boundary, and m is the modification period of the SC-MCCH configured in SIB20 (i.e., sc-mcch-ModificationPeriod). 2) The radio frame for scheduling the SC-MCCH meets: SFN mod mcch-RepetitionPeriod=mcch-Offset, where SFN represents a system frame number of the radio frame, mcch-RepetitionPeriod represents the repetition period of the SC-MCCH, and mcch-Offset represents an offset of the SC-MCCH. 3) The subframe for scheduling the SC-MCCH is indicated by sc-mcch-Subframe.

The SC-MCCH is scheduled through a physical downlink control channel (Physical Downlink Control Channel, PDCCH). On the one hand, a new radio network temporary identity (Radio Network Temporary Identity, RNTI), i.e., single cell RNTI (Single Cell Notification RNTI, SC-N-RNTI), is introduced to identify the PDCCH (e.g., SC-MCCH PDCCH) for scheduling the SC-MCCH, and in an implementation, the SC-RNTI has a fixed value of FFFC. On the other hand, a new RNTI, i.e., single cell notification RNTI (Single Cell Notification RNTI, SC-N-RNTI) is introduced to identify the PDCCH (e.g., notification PDCCH) for indicating a change notification of the SC-MCCH, and in an implementation, the SC-N-RNTI has a fixed value of FFFB; further, one bit of eight bits of DCI 1C may be used to indicate the change notification. In LTE, the configuration information of SC-PTM is based on the SC-MCCH configured by SIB20, and then the SC-MCCH configures the SC-MTCH, which is used to transport service data.

Specifically, the SC-MCCH transmits only one message (i.e., SCPTMConfiguration), which is used to configure the configuration information of SC-PTM. The configuration information of SC-PTM includes: a temporary mobile group identity (Temporary Mobile Group Identity, TMGI), a session ID (session id), a group RNTI (Group RNTI, G-RNTI), discontinuous reception (Discontinuous Reception, DRX) configuration information, SC-PTM service information of an adjacent cell, and the like. It should be noted that SC-PTM in R13 does not support a function of robust header compression (Robust Header Compression, ROHC).

The downlink discontinuous reception of SC-PTM is controlled by the following parameters: onDurationTimerSCPTM, drx-InactivityTimerSCPTM, SC-MTCH-SchedulingCycle, and SC-MTCH-SchedulingOffset.

When [(SFN*10)+subframe number] modulo (SC-MTCH-SchedulingCycle)=SC-MTCH-SchedulingOffset is satisfied, the timer onDurationTimerSCPTM is started;

When the downlink PDCCH schedule is received, the timer drx-InactivityTimerSCPTM is started;

The downlink SC-PTM service is received only when the timer onDurationTimerSCPTM or drx-InactivityTimerSCPTM is running.

SC-PTM service continuity adopts a MBMS service continuity concept based on SIB15, that is, a "SIB15+MBMSInterestIndication" mode. The service continuity of a UE in the idle state is based on a concept of frequency priority.

In NR, service requirements of groupcast and broadcast need to be supported in many scenarios, such as in the Internet of vehicles and industrial Internet. Therefore, it is necessary to introduce MBMS into NR. On the one hand, some MBMS services in NR need feedback to be performed. On the other hand, a concept of beam is introduced into NR, and data transmission adopts a beam sweeping mode, and then it is necessary to clarify how to perform beam management for MBMS services. On still another hand, it is necessary to clarify how to dynamically adjust the scheduling information of an MBMS service in a scheduling process of the MBMS service to improve spectral efficiency. To this end, the following technical solutions of the embodiments of the present disclosure are proposed. The MBMS service in the embodiments of the present disclosure includes but is not limited to a groupcast service and a multicast service.

Figure 5:
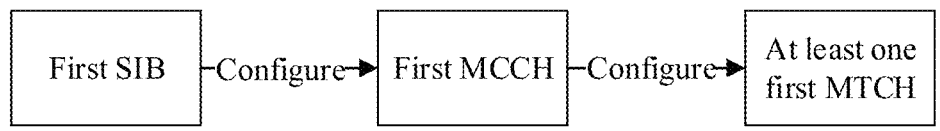
FIG. 5 is a schematic diagram of related configuration of a first system information block (System Information Block, SIB) according to an embodiment of the present disclosure.

In the technical solutions of the embodiments of the present disclosure, a new SIB (called a first SIB) is defined. Referring to FIG. 5, the first SIB includes configuration information of a first MCCH. Here, the first MCCH is a control channel of an MBMS service, in other words, the first SIB is used to configure configuration information of a control channel of an NR MBMS. In an implementation, the control channel of the NR MBMS may also be called an NR MCCH (i.e., the first MCCH).

Further, the first MCCH is used to carry first signaling, the embodiment of the present disclosure does not limit a name of the first signaling. For example, the first signaling is signaling A, and the first signaling includes configuration information of at least one first MTCH. Here, the first MTCH is a service channel (also may be referred to as data channel or transport channel) of an MBMS service, the first MTCH is used to transmit MBMS service data (such as NR MBMS service data). In other words, the first MCCH is used to configure configuration information of the service channel of NR MBMS. In an implementation, the service channel of NR MBMS may also be called an NR MTCH (i.e., the first MTCH).

Specifically, the first signaling is used to configure the service channel of NR MBMS, service information corresponding to the service channel and scheduling information corresponding to the service channel. Further, in an implementation, the service information corresponding to the service channel includes, for example, a TMGI, a session ID and other identification information for identifying a service. The scheduling information corresponding to the service channel includes, for example, an RNTI which is used when MBMS service data is scheduled, such as a G-RNTI, DRX configuration information, etc.

It should be noted that transmission of the first MCCH and the first MTCH is scheduled based on PDCCH, where the RNTI used by the PDCCH for scheduling the first MCCH uses a unique identifier of the whole network, that is, a fixed value. The RNTI used by the PDCCH for scheduling the first MTCH is configured through the first MCCH.

It should be noted that the embodiments of the present disclosure do not limit the naming of the first SIB, the first MCCH and the first MTCH. For ease of description, the first SIB may also be referred to as SIB, the first MCCH may also be referred to as MCCH, and the first MTCH may also be referred to as MTCH.

Figure 6:
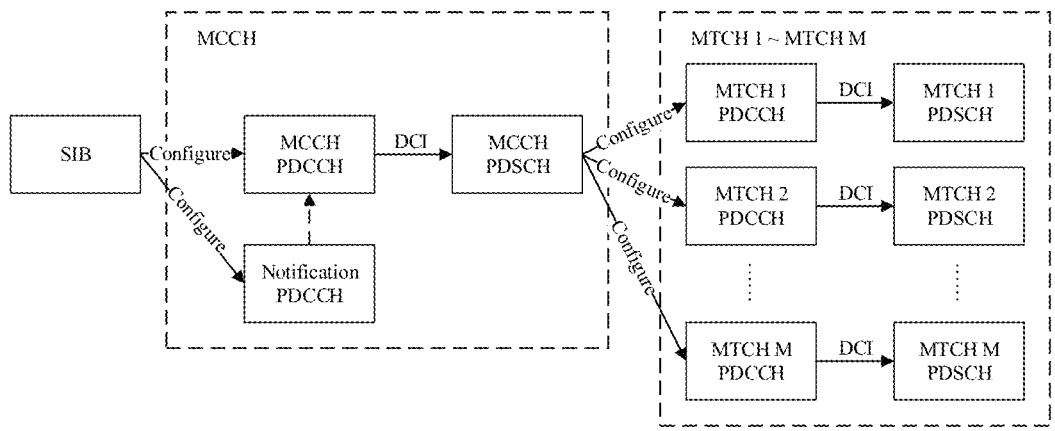
FIG. 6 is a schematic diagram of a point to multipoint (Point To Multipoint, PTM) configuration transmission mechanism according to an embodiment of the present disclosure.
Figure 7:
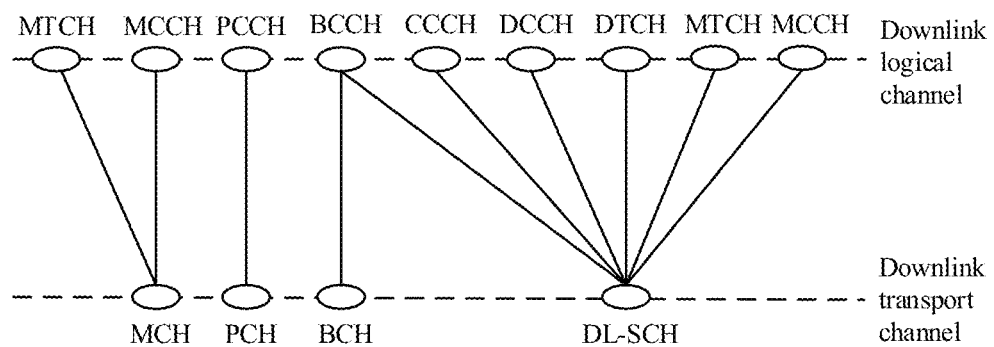
FIG. 7 is a PTM channel and its mapping diagram according to an embodiment of the present disclosure.

Referring to FIG. 6, a PDCCH (i.e., MCCH PDCCH) for scheduling an MCCH and a PDCCH for notification are configured through SIB, where a PDSCH (i.e., MCCH PDSCH) for transmitting the MCCH is scheduled through DCI carried by the MCCH PDCCH. Further, M PDCCHs for scheduling MTCHs (i.e. MTCH 1 PDCCH, MTCH 2 PDCCH, . . . , MTCH M PDCCH) are configured through the MCCH, where DCI carried by MTCH n PDCCH schedules the PDSCH for transmitting MTCH n (i.e. MTCH n PDSCH), where n is an integer greater than or equal to 1 and less than or equal to M. Referring to FIG. 7, MCCH and MTCH are mapped to DL-SCH, and further, DL-SCH is mapped to PDSCH, where MCCH and MTCH belong to logical channels, DL-SCH belongs to a transport channel and PDSCH belongs to a physical channel.

FIG. 8 is a flow diagram of an information indication method according to an embodiment of the present disclosure. As shown in FIG. 8, the information indication method includes the following steps:

Step 801: a terminal device receives first indication information sent by a network device, where the first indication information is used to indicate at least one of the following: a first MBMS service requiring to be received by a connected-state terminal device; a first MBMS service requiring HARQ feedback to be performed; a first MBMS service requiring CSI reporting to be performed; or a first MBMS service requiring to beam management to be performed.

In the embodiment of the present disclosure, the network device sends the first indication information to the terminal device, and accordingly, the terminal device receives the first indication information sent by the network device. Here, the network device may be a base station, such as a gNB.

In an optional implementation, when configuring the first MBMS service, the network device configures the first indication information, which is used to indicate at least one of the following: the first MBMS service requiring to be received by a connected-state terminal device; the first MBMS service requiring HARQ feedback to be performed; the first MBMS service requiring CSI reporting to be performed; or the first MBMS service requiring beam management to be performed. It should be noted that configuring the first MBMS service by the network device here refers to configuring service information, scheduling information, etc. of the first MBMS service.

It should be noted that the above first indication information is only an illustrative description. In an optional implementation, the network device may indicate one or more of the above contents through one piece of indication information. In another optional implementation, the network device may indicate the above contents through a plurality of pieces of indication information.

In the embodiment of the present disclosure, the terminal device sends second indication information to the network device after entering the connected state, and the network device receives the second indication information sent by the terminal device, where the second indication information is used to indicate identification information of the first MBMS service which the terminal device is prepared to receive or is receiving.

For example: if the terminal device wants to receive an MBMS service (e.g., the first MBMS service) after entering the connected state, the terminal device indicates the identification information of the MBMS service which it is prepared to receive in an uplink RRC message.

For example: the terminal device has received an MBMS service (such as the first MBMS service) before entering the connection state, and the terminal device indicates the identification information of the MBMS service which it is receiving in an uplink RRC message after entering the connected state.

In an optional implementation, the identification information of the first MBMS service includes at least one of the following: a G-RNTI, a TMGI or session identification.

In an embodiment of the present disclosure, the terminal device may determine at least one of the following based on the received first indication information: the terminal device can receive the first MBMS service only after entering the connected state, the first MBMS service requires HARQ feedback to be performed, the first MBMS service requires CSI reporting to be performed, or the first MBMS service requires beam management to be performed. Based on this, if the terminal device performs HARQ feedback, it is necessary to specify a HARQ feedback resource. If the terminal device performs CSI reporting, it is necessary to specify a CSI reporting resource, and/or specify a CSI-reference signal (CSI-Reference Signal, CSI-RS) resource and CSI reporting configuration. If the first MBMS service requires beam management to be performed, it is necessary to specify a first transmission configuration indicator state (Transmission Configuration Indicator state, TCI state) set corresponding to the first MBMS service.

To this end, the network device sends configuration information of the first MBMS service to the terminal device based on the identification information of the first MBMS service, the terminal device receives the configuration information of the first MBMS service sent by the network device, and performs HARQ feedback and/or CSI reporting based on the configuration information of the first MBMS service. It should be noted that configuring the first MBMS service by the network device here refers to configuring feedback resource information, reporting resource information, beam-related information, etc. of the first MBMS service.

In an optional implementation, the configuration information of the first MBMS service is carried in RRC dedicated signaling or a common channel. Further, in an implementation, the common channel may be a system broadcast message (e.g., a first SIB) or groupcast control signaling (e.g., a first MTCH).

In an embodiment of the present disclosure, the specific content of the configuration information of the first MBMS service may be flexibly configured in combination with the following two scenarios.

●Scheduling Adaption Scenario

The configuration information of the first MBMS service is used to determine at least one of the following:
a HARQ feedback resource of the first MBMS service;
a G-RNTI corresponding to the first MBMS service;
a CSI reporting resource of the first MBMS service; or
a CSI-RS resources and CSI reporting configuration corresponding to the first MBMS service.

The terminal device performs a measurement on a CSI-RS corresponding to the first MBMS service based on the configuration information of the first MBMS service, and reports a CSI measurement report to the network device, and the network device receives the CSI measurement report reported by the terminal device. Further, in an implementation, the measurement of the CSI-RS may be a measurement of a reference signal receiving power (Reference Signal Receiving Power, RSRP) of the CSI-RS.

In an optional manner, the CSI measurement report is used to adjust a scheduling parameter of the first MBMS service. That is: the network device adjusts the scheduling parameter of the first MBMS service based on the CSI measurement report. Here, the scheduling parameter may be transport block size (TB size), modulation and coding scheme (Modulation and Coding Scheme, MCS), etc.

In another optional manner, the CSI measurement report is used to adjust a receiving beam of the first MBMS service. That is: the network device adjusts the receiving beam of the first MBMS service based on the CSI measurement report. In a specific implementation, the network device may adjust a beam on which the terminal receives the first MBMS service through a MAC CE or RRC signaling or a PDCCH.

●Beam Management Scenario

The configuration information of the first MBMS service is used to determine at least one of the following:
a HARQ feedback resource of the first MBMS service;
a G-RNTI corresponding to the first MBMS service;
a CSI reporting resource of the first MBMS service;
a CSI-RS resource and CSI reporting configuration corresponding to the first MBMS service;
a first TCI state set corresponding to the first MBMS service; or
a label of the terminal device in a service receiving group corresponding to the first MBMS service.

The terminal device performs a measurement on a CSI-RS corresponding to the first MBMS service based on the configuration information of the first MBMS service, and reports a CSI measurement report to the network device, and the network device receives the CSI measurement report reported by the terminal device. Further, in an implementation, the measurement of the CSI-RS may be a measurement of a reference signal receiving power (Reference Signal Receiving Power, RSRP) of the CSI-RS.

In an embodiment of the present disclosure, the CSI measurement report is used to adjust a receiving beam of the first MBMS service. That is: the network device configures a beam-related TCI state set (i.e., a second TCI state set) based on the CSI measurement report. Specifically, the network device sends third indication information to the terminal device, and the terminal device receives the third indication information sent by the network device. The third indication information is used to indicate the second TCI state set corresponding to the first MBMS service, and the second TCI state set is a subset of the first TCI state set. The terminal device receives the first MBMS service based on the second TCI state set.

Further, in an implementation, the third instruction information is carried in the scheduling information of the first MBMS service. For example: when scheduling the first MBMS service, a base station carries the indication information indicating a preferred receiving beam set of the first MBMS service (i.e., the second TCI state set) in the scheduling information.

Further, in an implementation, the third indication information is carried in a media access control control element (Media Access Control Control Element, MAC CE) or RRC signaling. For example: a base station configures the preferred receiving beam set of the first MBMS service (i.e., the second TCI state set) through a MAC CE or RRC signaling.

Here, the MAC CE is a MAC CE related to an MBMS service. Logical channel identification associated with the MAC CE and/or a type of the MAC CE are configured through RRC dedicated signaling; or, logical channel identification associated with the MAC CE and/or a type of the MAC CE are configured through a common channel.

In an optional manner, the second TCI state set includes a preferred receiving beam set of the terminal device.

In another optional manner, the second TCI state set includes preferred receiving beam sets of all terminal devices in the service receiving group corresponding to the first MBMS service. Further, in an implementation, the preferred receiving beam sets in the second TCI state set are arranged in order based on labels of all terminal devices in the service receiving group. Here, the label of the terminal device is a number of the terminal device in the service receiving group corresponding to the first MBMS service, and the number is pre-configured or configured through the network. For example, the label of the terminal device is configured by the network device to the terminal device through RRC signaling, when the terminal device enters the connected state and then indicates to the network device that the terminal device wants to receive a group MBMS service.

It should be noted that the preferred receiving beam in the above solution refers to a beam on which the first MBMS service is received with a relatively good quality. The preferred receiving beam is a beam for the terminal device, and accordingly, the preferred receiving beam may also be replaced with a corresponding preferred transmitting beam, and the preferred transmitting beam is a beam for the network device.

FIG. 9 is a first schematic diagram of structural composition of an information indication apparatus according to an embodiment of the present disclosure, which is applied to a terminal device. As shown in FIG. 9, the information indication apparatus includes:

a receiving unit 901, configured to receive first indication information sent by a network device, where the first indication information is used to indicate at least one of the following:

a first MBMS service requiring to be received by a connected-state terminal device;

a first MBMS service requiring HARQ feedback to be performed;

a first MBMS service requiring CSI reporting to be performed; or a first MBMS service requiring beam management to be performed.

In an optional implementation, the apparatus further includes:

a sending unit 902, configured to send second indication information to the network device after the terminal device enters the connected state, where the second indication information is used to indicate identification information of the first MBMS service which the terminal device is prepared to receive or is receiving.

In an optional implementation, the identification information of the first MBMS service includes at least one of the following: a G-RNTI, a TMGI or session identification.

In an optional implementation, the receiving unit 901 is further configured to receive configuration information of the first MBMS service sent by the network device, and perform HARQ feedback and/or CSI reporting based on the configuration information of the first MBMS service.

In an optional implementation, the configuration information of the first MBMS service is carried in RRC dedicated signaling or a common channel.

In an optional implementation, the configuration information of the first MBMS service is used to determine at least one of the following:

a HARQ feedback resource of the first MBMS service;

a G-RNTI corresponding to the first MBMS service;

a CSI reporting resource of the first MBMS service;

a CSI-RS resource and CSI reporting configuration corresponding to the first MBMS service;

a first TCI state set corresponding to the first MBMS service; or a label of the terminal device in a service receiving group corresponding to the first MBMS service.

In an optional implementation, the apparatus further includes:

a measuring unit 903, configured to perform a measurement on a CSI-RS corresponding to the first MBMS service based on the configuration information of the first MBMS service; and a reporting unit 904, configured to report a CSI measurement report to the network device.

In an optional implementation, the CSI measurement report is used to adjust a scheduling parameter of the first MBMS service.

In an optional implementation, the CSI measurement report is used to adjust a receiving beam of the first MBMS service.

In an optional implementation, the receiving unit 901 is further configured to receive third indication information sent by the network device, where the third indication information is used to indicate a second TCI state set corresponding to the first MBMS service, and the second TCI state set is a subset of the first TCI state set; and receive the first MBMS service based on the second TCI state set.

In an optional implementation, the third indication information is carried in scheduling information of the first MBMS service.

In an optional implementation, the third indication information is carried in a MAC CE or RRC signaling.

In an optional implementation, logical channel identification associated with the MAC CE and/or a type of the MAC CE are configured through RRC dedicated signaling; or, logical channel identification associated with the MAC CE and/or a type of the MAC CE are configured through a common channel.

In an optional implementation, the second TCI state set includes a preferred receiving beam set of the terminal device.

In an optional implementation, the second TCI state set includes preferred receiving beam sets of all terminal devices in a service receiving group corresponding to the first MBMS service.

In an optional implementation, the preferred receiving beam sets in the second TCI state set are arranged in order based on labels of all terminal devices in the service receiving group.

In an optional implementation, the label of the terminal device is a number of the terminal device in the service receiving group corresponding to the first MBMS service, and the number is pre-configured or configured through the network.

Those skilled in the art should understand that the relevant description of the above information indication apparatus of the embodiment of the present disclosure may be understood with reference to the relevant description of the information indication method of the embodiment of the present disclosure.

FIG. 10 is a second schematic diagram of a structural composition of an information indication apparatus according to an embodiment of the present disclosure, which is applied to a network device. As shown in FIG. 10, the information indication apparatus includes:

a sending unit 1001, configured to send first indication information to a terminal device, where the first indication information is used to indicate at least one of the following:

a first MBMS service requiring to be received by a connected-state terminal device;

a first MBMS service requiring HARQ feedback to be performed;

a first MBMS service requiring CSI reporting to be performed; or a first MBMS service requiring beam management to be performed.

In an optional implementation, the apparatus further includes:

a receiving unit 1002, configured to receive second indication information sent by the terminal device, where the second indication information is used to indicate identification information of the first MBMS service which the terminal device is prepared to receive or is receiving.

In an optional implementation, the identification information of the first MBMS service includes at least one of the following: a G-RNTI, a TMGI or session identification.

In an optional implementation, the sending unit 1001 is further configured to send configuration information of the first MBMS service to the terminal device based on the identification information of the first MBMS service.

In an optional implementation, the configuration information of the first MBMS service is carried in RRC dedicated signaling or a common channel.

In an optional implementation, the configuration information of the first MBMS service is used to determine at least one of the following:

a HARQ feedback resource of the first MBMS service;

a G-RNTI corresponding to the first MBMS service;

a CSI reporting resource of the first MBMS service;

a CSI-RS resource and CSI reporting configuration corresponding to the first MBMS service;

a first TCI state set corresponding to the first MBMS service; or a label of the terminal device in a service receiving group corresponding to the first MBMS service.

In an optional implementation, the receiving unit 1002 is further configured to receive a CSI measurement report reported by the terminal device.

In an optional implementation, the apparatus further includes:

an adjusting unit 1003, configured to adjust a scheduling parameter of the first MBMS service based on the CSI measurement report.

In an optional implementation, the apparatus further includes:

an adjusting unit 1003, configured to adjust a receiving beam of the first MBMS service based on the CSI measurement report.

In an optional implementation, the sending unit 1001 is further configured to send third indication information to the terminal device, where the third indication information is used to indicate a second TCI state set corresponding to the first MBMS service, and the second TCI state set is a subset of the first TCI state set.

In an optional implementation, the third indication information is carried in scheduling information of the first MBMS service.

In an optional implementation, the third indication information is carried in a MAC CE or RRC signaling.

In an optional implementation, logical channel identification associated with the MAC CE and/or a type of the MAC CE are configured through RRC dedicated signaling; or, logical channel identification associated with the MAC CE and/or a type of the MAC CE are configured through a common channel.

In an optional implementation, the second TCI state set includes a preferred receiving beam set of the terminal device.

In an optional implementation, the second TCI state set includes preferred receiving beam sets of all terminal devices in a service receiving group corresponding to the first MBMS service.

In an optional implementation, the preferred receiving beam sets in the second TCI state set are arranged in order based on labels of all terminal devices in the service receiving group.

In an optional implementation, the label of the terminal device is a number of the terminal device in the service receiving group corresponding to the first MBMS service, and the number is pre-configured or configured through the network.

Those skilled in the art should understand that the relevant description of the above information indication apparatus of the embodiment of the present disclosure may be understood with reference to the relevant description of the information indication method of the embodiment of the present disclosure.

Figure 11:
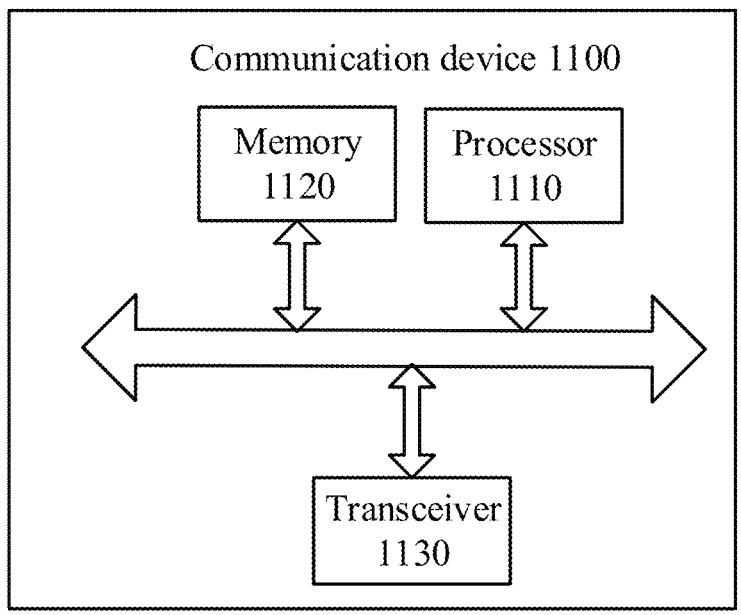
FIG. 11 is a schematic structural diagram of a communication device according to an embodiment of the present disclosure.

FIG. 11 is a schematic structural diagram of a communication device 1100 according to an embodiment of the present disclosure. The communication device may be a terminal device or a network device. The communication device 1100 shown in FIG. 11 includes a processor 1110, and the processor 1110 may call and run a computer program from a memory to implement the methods in the embodiments of the present disclosure.

In an implementation, as shown in FIG. 11, the communication device 1100 may also include a memory 1120. The processor 1110 may call and run the computer program from the memory 1120 to implement the methods in the embodiments of the present disclosure.

The memory 1120 may be a separate device independent of the processor 1110 or may be integrated into the processor 1110.

In an implementation, as shown in FIG. 11, the communication device 1100 may also include a transceiver 1130, and the processor 1110 may control the transceiver 1130 to communicate with other devices. Specifically, it may send information or data to other devices or receive information or data sent by other devices.

The transceiver 1130 may include a transmitter and a receiver. The transceiver 1130 may further include antennas, and the number of antennas may be one or more.

In an implementation, the communication device 1100 may specifically be the network device of the embodiment of the present disclosure, and the communication device 1100 may implement the corresponding process implemented by the network device in the methods of the embodiments of the present disclosure, which will not be repeated herein for the sake of conciseness.

In an implementation, the communication device 1100 may specifically be a mobile terminal/terminal device of the embodiments of the present disclosure, and the communication device 1100 may implement the corresponding processes implemented by the mobile terminal/terminal device in the methods of the embodiments of the present disclosure, which will not be repeated herein for the sake of conciseness.

Figure 12:
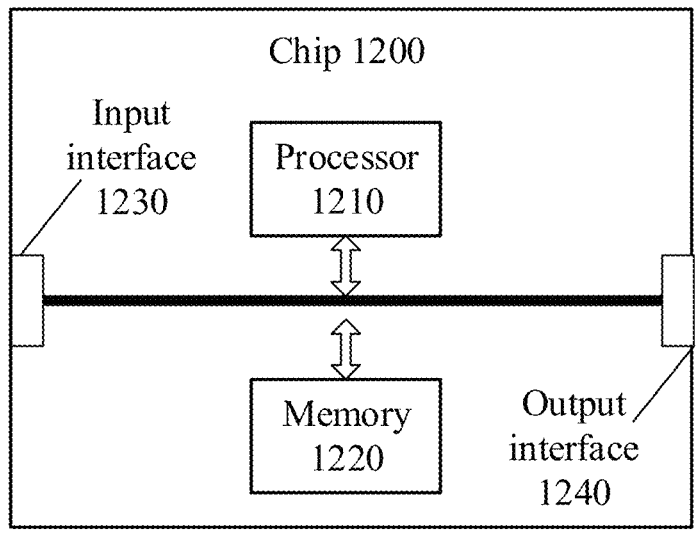
FIG. 12 is a schematic structural diagram of a chip according to an embodiment of the present disclosure.

FIG. 12 is a schematic structural diagram of a chip according to an embodiment of the present disclosure. The chip 1200 shown in FIG. 12 includes a processor 1210, and the processor 1210 may call and run a computer program from a memory to implement the methods in the embodiments of the present disclosure.

In an implementation, as shown in FIG. 12, the chip 1200 may further include a memory 1220. The processor 1210 may call and run the computer program from the memory 1220 to implement the methods in the embodiments of the present disclosure.

The memory 1220 may be a separate device independent of the processor 1210 or may be integrated into the processor 1210.

In an implementation, the chip 1200 may further include an input interface 1230. The processor 1210 may control the input interface 1230 to communicate with other devices or chips. Specifically, it may obtain information or data sent by other devices or chips.

In an implementation, the chip 1200 may further include an output interface 1240. The processor 1210 may control the output interface 1240 to communicate with other devices or chips. Specifically, it may output information or data to other devices or chips.

In an implementation, the chip may be applied to the network device in the embodiments of the present disclosure, and the chip may implement the corresponding process implemented by the network device in the methods of the embodiments of the present disclosure, which will not be repeated herein for the sake of conciseness.

In an implementation, the chip may be applied to a mobile terminal/terminal device in the embodiments of the present disclosure, and the chip may implement the corresponding process implemented by the mobile terminal/terminal device in the methods of the embodiments of the present disclosure, which will not be repeated herein for the sake of conciseness.

It should be understood that the chip mentioned in the embodiment of the present disclosure may also be referred to as a system-level chip, a system chip, a chip system, or a system-on-chip, or the like.

Figure 13:
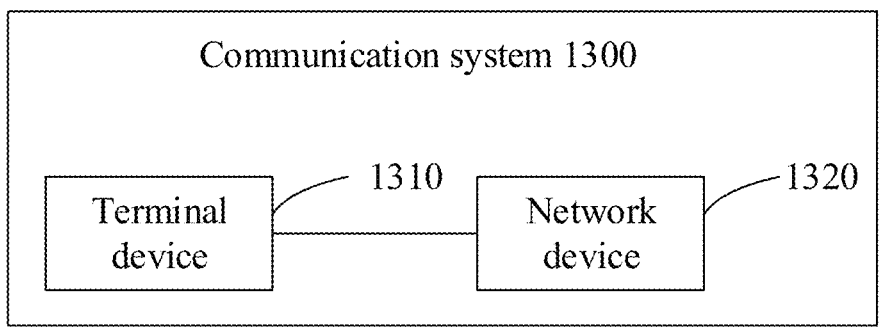
FIG. 13 is a schematic block diagram of a communication system according to an embodiment of the present disclosure.

FIG. 13 is a schematic block diagram of a communication system 1300 according to an embodiment of the present disclosure. As shown in FIG. 13, the communication system 1300 includes a terminal device 1310 and a network device 1320.

The terminal device 1310 may be configured to implement corresponding functions implemented by the terminal device in the above methods, and the network device 1320 may be configured to implement corresponding functions implemented by the network device in the above methods, which will not be repeated herein for the sake of conciseness.

It should be understood that the processor of the embodiments of the present disclosure may be an integrated circuit chip with signal processing capability. In an implementation process, the steps of the abovementioned method embodiments may be completed by a hardware integrated logic circuit in the processor or instructions in a form of software. The abovementioned processor may be a general-purpose processor, a digital signal processor (Digital Signal Processor, DSP), an application specific integrated circuit (Application Specific Integrated Circuit, ASIC), a field programmable gate array (FPGA) or other programmable logic devices, discrete gates or transistor logic devices, discrete hardware components. Each of the methods, steps, and logical block diagrams disclosed in the embodiments of the present disclosure may be implemented or performed. The general-purpose processor may be a microprocessor, or the processor may also be any conventional processor, or the like. The steps of the methods disclosed in the embodiments of the present disclosure may be directly embodied as performed and completed by a hardware decoding processor, or performed by a combination of hardware and software modules in a decoding processor. The software modules may be located in a mature storage medium in the art, such as a random memory, a flash memory, a read-only memory, a programmable read-only memory, or an electrically erasable programmable memory, a register, or the like. The storage medium is located in a memory, and the processor reads the information in the memory and completes the steps of the abovementioned method in combination with its hardware.

It can be understood that the memory in the embodiments of the present disclosure may be a volatile memory or a non-volatile memory, or may include both volatile and non-volatile memories. The non-volatile memory may be a read-only memory (Read-Only Memory, ROM), a programmable read-only memory (Programmable ROM, PROM), an erasable programmable read-only memory (Erasable PROM, EPROM), and an electrically erasable programmable read-only memory (Electrically EPROM, EEPROM), or a flash memory. The volatile memory may be a random access memory (Random Access Memory, RAM), which is used as an external cache. By way of illustration but not restriction, many forms of RAM are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchlink DRAM, SLDRAM) and a direct rambus random access memory (Direct Rambus RAM, DR RAM). It should be noted that the memories of the systems and methods described herein are intended to include, but are not limited to, these and any other suitable types of memories.

Embodiments of the present disclosure further provide a computer readable storage medium, configured to store a computer program.

In an implementation, the computer readable storage medium may be applied to the network device in the embodiments of the present disclosure, and the computer program causes the computer to execute the corresponding process implemented by the network device in the methods of the embodiments of the present disclosure, which will not be repeated herein for the sake of conciseness.

In an implementation, the computer readable storage medium may be applied to the mobile terminal/terminal device in the embodiments of the present disclosure, and the computer program causes the computer to execute the corresponding process implemented by the mobile terminal/terminal device in the methods of the embodiments of the present disclosure, which will not be repeated herein for the sake of conciseness.

Embodiments of the present disclosure further provide a computer program product, including computer program instructions.

In an implementation, the computer program product may be applied to the network device in the embodiments of the present disclosure, and the computer program instructions cause the computer to execute the corresponding process implemented by the network device in the methods of the embodiments of the present disclosure, which will not be repeated herein for the sake of conciseness.

In an implementation, the computer program product may be applied to the mobile terminal/terminal device in the embodiments of the present disclosure, and the computer program instructions cause the computer to execute the corresponding process implemented by the mobile terminal/terminal device in the methods of the embodiments of the present disclosure, which will not be repeated herein for the sake of conciseness.

Embodiments of the present disclosure further provide a computer program.

In an implementation, the computer program may be applied to the network device in the embodiments of the present disclosure, and the computer program, when running on a computer, causes the computer to execute the corresponding process implemented by the network device in the methods of the embodiments of the present disclosure, which will not be repeated herein for the sake of conciseness.

In an implementation, the computer program may be applied to the mobile terminal/terminal device in the embodiments of the present disclosure, and the computer program, when running on the computer, causes the computer to execute the corresponding process implemented by the mobile terminal/terminal device in the methods of the embodiments of the present disclosure, which will not be repeated herein for the sake of conciseness.

A person having ordinary skill in the art can understand that the units and algorithm steps described in combination with the embodiments disclosed herein may be implemented by electronic hardware, or a combination of computer software and electronic hardware. Whether these functions are executed by hardware or software depends on specific application and design constraints of the technical solution. Those skilled in the art may use a different method for each specific application to implement the described functions, while such implementations should not be considered as going beyond the scope of the present disclosure.

Those skilled in the art can clearly understand that, for the purpose of convenience and concise of the description, for the specific working process of the abovementioned system, device, and units, reference can be made to the corresponding process in the foregoing method embodiments, which will not be repeated herein.

In several embodiments provided in the present disclosure, it should be understood that the disclosed system, device and method may be implemented in other ways. For example, the apparatus embodiments described above are merely illustrative. For example, the division of the units is only a logical function division, and there may be other divisions in actual implementation. For example, a plurality of units or components may be combined or integrated into another system, or some features may be ignored or not executed. On the other hand, the displayed or discussed mutual coupling, direct coupling, or communicative connection may be indirect coupling or communicative connection through some interfaces, apparatuses or units, and may be electrical, mechanical or in other forms.

The units illustrated as separating components may or may not be physically separated, and the components displayed as units may be or may not be physical units, that is, may be located in one place, or may be distributed on a plurality of network units. Some or all of the units therein may be selected according to practical needs to achieve the purpose of the solutions of the embodiments.

In addition, each of the functional units in each of the embodiments of the present disclosure may be integrated into one processing unit, or each unit may physically independent, or two or more units may be integrated into one unit.

If the functions are implemented in the form of software functional units and sold or used as an independent product, they can be stored in a computer readable storage medium. Based on this understanding, the technical solution of the present disclosure may be essentially or the part that contributes to the prior art or a part of the technical solution may be embodied in the form of a software product. The computer software product is stored in a storage medium, including several instructions for a computer device (which may be a personal computer, a server, or a network device, etc.) to execute all or part of the steps of the method described in each of the embodiments of the present disclosure. The aforementioned storage medium includes: a U disk, a mobile hard disk, a ROM, a RAM, a magnetic disk or an optical disk or other kinds of media capable of storing program code.

The abovementioned is only specific implementations of the present disclosure, but the protection scope of the present disclosure is not limited thereto. Any person skilled in the art can easily think of variations or substitutions within the technical scope disclosed in the present disclosure, which should be covered within the protection scope of the present disclosure. Therefore, the protection scope of the present disclosure shall be subject to the protection scope of the claims.

What is claimed is:

1. An information indication method, the method comprising:
    receiving, by a terminal device, first indication information sent by a network device, wherein the first indication information is used to indicate a first multimedia broadcast multicast service (MBMS) service requiring beam management to be performed;
    receiving, by the terminal device, configuration information of the first MBMS service sent by the network device, and performing channel state information (CSI) reporting based on the configuration information of the first MBMS service;
    wherein the performing CSI reporting based on the configuration information of the first MBMS service comprises:
    performing, by the terminal device, a measurement on a CSI-reference signal (CSI-RS) corresponding to the first MBMS service based on the configuration information of the first MBMS service, and reporting a CSI measurement report to the network device;
    wherein the CSI measurement report is used to adjust a receiving beam of the first MBMS service;
    wherein the configuration information of the first MBMS service is used to determine a first transmission configuration indicator (TCI) state set corresponding to the first MBMS service;
    wherein the method further comprises:
    receiving, by the terminal device, third indication information sent by the network device, wherein the third indication information is used to indicate a second TCI state set corresponding to the first MBMS service, and the second TCI state set is a subset of the first TCI state set; and
    receiving, by the terminal device, the first MBMS service based on the second TCI state set.

2. The method according to claim 1, wherein the method further comprises:
sending, by the terminal device, second indication information to the network device after the terminal device enters the connected state, wherein the second indication information is used to indicate identification information of the first MBMS service which the terminal device is prepared to receive or is receiving.

3. The method according to claim 2, wherein the identification information of the first MBMS service comprises at least one of the following: a G-RNTI, a temporary mobile group identity (TMGI) or session identification.

4. The method according to claim 2, wherein the method further comprises:
performing, by the terminal device hybrid automatic repeat request (HARQ) feedback based on the configuration information of the first MBMS service.

5. The method according to claim 1, wherein the configuration information of the first MBMS service is carried in radio resource control (RRC) dedicated signaling or a common channel.

6. The method according to claim 1, wherein the configuration information of the first MBMS service is further used to determine at least one of the following:
a HARQ feedback resource of the first MBMS service;
a G-RNTI corresponding to the first MBMS service;
a CSI reporting resource of the first MBMS service;
a CSI-RS resource and CSI reporting configuration corresponding to the first MBMS service;
or
a label of the terminal device in a service receiving group corresponding to the first MBMS service.

7. The method according to claim 1, wherein the CSI measurement report is used to adjust a scheduling parameter of the first MBMS service.

8. The method according to claim 1, wherein the third indication information is carried in scheduling information of the first MBMS service; or
the third indication information is carried in a media access control control unit (MAC CE) or radio resource control (RRC) signaling.

9. The method according to claim 8, wherein,
logical channel identification associated with the MAC CE and/or a type of the MAC CE are configured through RRC dedicated signaling; or,
logical channel identification associated with the MAC CE and/or a type of the MAC CE are configured through a common channel.

10. The method according to claim 1, wherein the second TCI state set comprises a preferred receiving beam set of the terminal device; or
the second TCI state set comprises preferred receiving beam sets of all terminal devices in a service receiving group corresponding to the first MBMS service.

11. The method according to claim 10, wherein the preferred receiving beam sets in the second TCI state set are arranged in order based on labels of all terminal devices in the service receiving group.

12. The method according to claim 11, wherein the label of the terminal device is a number of the terminal device in the service receiving group corresponding to the first MBMS service, and the number is pre-configured or configured through the network.

13. A chip, comprising: a processor, configured to call and run a computer program from a memory, to cause a device installed with the chip to execute the method according to claim 1.

14. A non-transitory computer readable storage medium, configured to store a computer program, the computer program causing a computer to execute the method according to claim 1.

15. An information indication method, the method comprising:
sending, by a network device, first indication information to a terminal device, wherein the first indication information is used to indicate a first multimedia broadcast multicast service (MBMS) service requiring beam management to be performed;
sending, by the network device, configuration information of the first MBMS service to the terminal device, so that the terminal device performs channel state information (CSI) reporting based on the configuration information of the first MBMS service;
receiving, by the network device, a CSI measurement report reported by the terminal device:
adjusting, by the network device, a receiving beam of the first MBMS service based on the CSI measurement report;
wherein the configuration information of the first MBMS service is used to determine a first transmission configuration indicator (TCI) state set corresponding to the first MBMS service;
wherein the method further comprises:
sending, by the network device, third indication information to the terminal device, wherein the third indication information is used to indicate a second TCI state set corresponding to the first MBMS service, and the second TCI state set is a subset of the first TCI state set.

16. A network device, comprising: a processor and a memory, wherein the memory is configured to store a computer program, and the processor is configured to call and run the computer program stored in the memory to execute the method according to claim 15.

17. A non-transitory computer readable storage medium, configured to store a computer program, the computer programs causing a computer to execute the method according to claim 15.

18. An information indication apparatus applied to a terminal device, wherein the apparatus comprises: a processor and a memory, wherein the memory is configured to store a computer program, and when the processor, when executing the program, is configured to:
receive first indication information sent by a network device, wherein the first indication information is used to indicate a first multimedia broadcast multicast service (MBMS) service requiring beam management to be performed;
receive configuration information of the first MBMS service sent by the network device, and perform channel state information (CSI) reporting based on the configuration information of the first MBMS service;
perform a measurement on a CSI-RS corresponding to the first MBMS service based on the configuration information of the first MBMS service, and report a CSI measurement report to the network device;
wherein the CSI measurement report is used to adjust a receiving beam of the first MBMS service;
wherein the configuration information of the first MBMS service is used to determine a first transmission configuration indicator (TCI) state set corresponding to the first MBMS service;
wherein the processor is further configured to:
receive third indication information sent by the network device, wherein the third indication information is used to indicate a second TCI state set corresponding to the first MBMS service, and the second TCI state set is a subset of the first TCI state set; and receive the first MBMS service based on the second TCI state set.

* * * * *